J. H. COOK.
WALL ANCHOR.
APPLICATION FILED APR. 24, 1908.
917,927.
Patented Apr. 13, 1909.
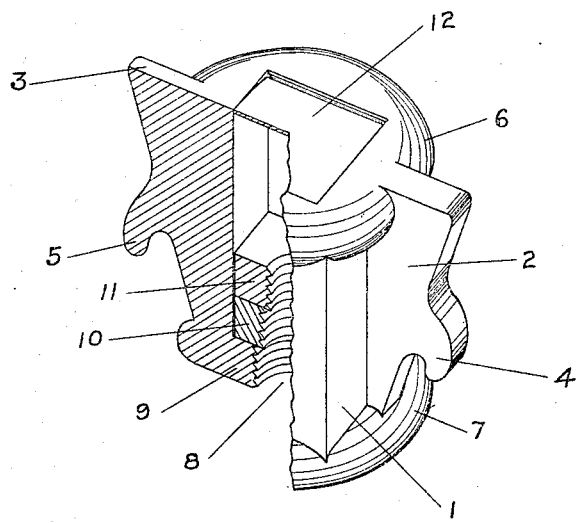

UNITED STATES PATENT OFFICE.

JOHN H. COOK, OF NEW YORK, N. Y., ASSIGNOR TO HENRY B. NEWHALL, OF PLAINFIELD, NEW JERSEY.

WALL-ANCHOR.

No. 917,927.

Specification of Letters Patent.

Patented April 13, 1909.

Application filed April 24, 1908. Serial No. 428,911.

*To all whom it may concern:*

Be it known that I, JOHN H. COOK, a citizen of the United States, residing at the borough of Brooklyn, city of New York, county of Kings, and State of New York, have invented certain new and useful Improvements in Wall-Anchors, of which the following is a specification.

My invention relates to improvements in supports for universal application in the arts.

For purposes of illustrating one use of my invention, I have shown it in the form of a wall support or socket, which may be secured to, or embodied in a wall for receiving and retaining bolts, screws or similar members of various sizes.

The accompanying drawing is a perspective view of the device parts being broken away.

Similar characters refer to similar parts throughout the several views.

A socket or body member 1 preferably though not necessarily formed solid and square in cross section and having annular projections 6 and 7 formed thereon is preferably provided with two wings or leaves 2 and 3 each having lugs 4 and 5 respectively to engage the reinforcing bars of a concrete or other wall. This socket member 1 has a longitudinal socket 8 formed therein extending from front to rear with a contracted fixed screw threaded member or neck section 9 at its forward end.

Within the longitudinal socket 8 I place one or more concentric interiorly screw threaded movable members as nuts 10 and 11, the apertures in said movable members 10 and 11 are graduated, the movable member next adjoining the contracted fixed screw threaded member or neck 9 of the socket 8 having a screw threaded aperture smaller than that of the neck 9 and the next adjoining movable member 11 having a still smaller screw aperture.

After the movable members or nuts are placed within the socket 8 I place a cover or guard 12 over the rear opening of the socket 8 to prevent the removal of the movable members or nuts and also to prevent concrete or other foreign material from entering the socket through this opening if the device is being used in concrete construction.

When my device is assembled as above described it is inserted in the wall at any desired point with the front or smaller end of the device preferably flush with the surface, and bolts of any desired diameter corresponding with the diameter of any of the screw threaded apertures of my device may be inserted.

A bolt inserted in the screw threaded fixed member or neck of the device and of such size as to fit into those threads will not be interfered with by the movable members 10 and 11, as their apertures being of a smaller diameter than that of the bolt, they will be pushed to the back or rear of the socket as the bolt enters, and the same is true of each of the movable members, the member or nut receiving the bolt being drawn forward against the inner face of the contracted fixed member or neck 9 of the socket 8 and the movable member or nuts with smaller apertures being pushed to the rear of the socket by the bolt.

While I have shown only two movable members or nuts, as many movable members or nuts may be used in the device as desired. The form of my device shown in the drawings is preferred as this prevents the device from being pulled out of the wall in which it is embedded, and I also prefer to use the lugs 4 and 5 to engage reinforcing rods or bars usually provided in concrete walls, to more securely hold the socket member. I also provide the wings 2 and 3 to prevent the device from turning in the wall.

While I have described my invention in connection with a concrete structure, it is to be distinctly understood that it is adapted for application with structures or articles formed of masonry, brick, metal, wood or any other material or any combination of such materials; and further it is adapted for universal application as a support with any article formed of any material. Furthermore the socket member may be formed of any contour though preferably it is formed non-circular to prevent its turning in the structure in which it is embedded or fastened. It is to be also understood that both the wings and lugs may be omitted or either of them as found convenient or expedient and that the cover or guard may be likewise omitted, or fastened, or cast integral with the socket or body member. I preferably form the throat or fixed member integral with the socket member but it may be otherwise secured. The nuts may be of the form shown, though any other form of nuts or movable members may be used as desired.

Having thus described my invention what I claim is:

1. In a device of the character described, the combination of a socket member provided with a plurality of nuts, having interiorly screw threaded apertures of graduated sizes, and so arranged that the diameter of the aperture of each successive nut is larger than that of the nut behind it.

2. In a device of the character described, the combination of a socket member provided with wings, and having a plurality of nuts having apertures of graduated sizes, and so arranged that the diameter of the aperture of each successive nut is larger than that of the nut behind it.

3. In a device of the character described, the combination of a socket member having wings which are provided with projecting lugs, and having a plurality of nuts having apertures of graduated sizes, and so arranged that the diameter of the aperture of each successive nut is larger than that of the nut behind it.

4. In a device of the character described the combination of a plurality of concentrically apertured bolt receiving members within a casing, the apertures in the said bolt receiving members being respectively arranged so that the aperture of the bolt receiving members are graduated from the largest at the mouth of the socket member to the smallest at the rear thereof.

5. In a support, a body or socket member, a fixed member secured to the body member and provided with engaging surfaces and one or more movable members mounted in the body or socket member, said movable member or members being provided with graduated engaging surfaces.

6. In a support, a body or socket member, a fixed apertured member secured to the body member and provided with screw threads, one or more screw threaded apertured movable members mounted in the body or socket member, the apertures of the fixed and movable member or members being graduated.

7. In a wall socket, a body or socket member, a fixed member secured to the body member and provided with engaging surfaces and one or more movable members mounted in the body or socket member, said movable member or members being provided with graduated engaging surfaces.

8. In a wall socket, a body or socket member, a fixed apertured member secured to the body member and provided with screw threads, one or more screw threaded apertured movable members mounted in the body or socket member, the apertures of the fixed and movable member or members being graduated.

9. In a support, a body or socket member, a fixed member secured to the body member and provided with engaging surfaces, one or more movable members mounted in the body or socket member, said movable member or members being provided with graduated engaging surfaces and one or more annular projections on the exterior of the body or socket member.

10. In a support, a body or socket member, a fixed apertured member secured to the body member and provided with screw threads, one or more screw threaded apertured movable members mounted in the body or socket member, the apertures of the fixed and movable member or members being graduated and one or more wings and one or more annular projections on the exterior of the body or socket member.

In testimony whereof, I have signed my name to this specification in the presence of two subscribing witnesses, this fifteenth day of April, 1908.

JOHN H. COOK

Witnesses:
   JUSTIN S. GALLAND,
   GEORGE M. FOULDS.